(12) United States Patent
Kundra et al.

(10) Patent No.: US 10,905,934 B2
(45) Date of Patent: Feb. 2, 2021

(54) GOLF SWING TRAINING APPARATUS

(71) Applicant: Monish Kundra, Washington, DC (US)

(72) Inventors: Monish Kundra, Washington, DC (US); Joginder P. Kundra, Cranbury, NJ (US)

(73) Assignee: Monish Kundra, Washington, DC (US)

( * ) Notice: Subject to any disclaimer, the term of this patent is extended or adjusted under 35 U.S.C. 154(b) by 0 days.

(21) Appl. No.: 16/706,178

(22) Filed: Dec. 6, 2019

(65) Prior Publication Data

US 2020/0179782 A1   Jun. 11, 2020

Related U.S. Application Data

(60) Provisional application No. 62/777,585, filed on Dec. 10, 2018.

(51) Int. Cl.
*A63B 69/36* (2006.01)
*A63B 60/46* (2015.01)
*A63B 60/00* (2015.01)

(52) U.S. Cl.
CPC .......... *A63B 69/3632* (2013.01); *A63B 60/46* (2015.10); *A63B 60/0081* (2020.08)

(58) Field of Classification Search
USPC ........ 473/219, 226, 229, 232, 242, 256, 457
See application file for complete search history.

(56) References Cited

U.S. PATENT DOCUMENTS

| | | | | | |
|---|---|---|---|---|---|
| 1,930,342 | A | * | 10/1933 | Graham | A63B 69/3632 473/232 |
| 3,136,546 | A | * | 6/1964 | Connolly | A63B 24/0062 473/234 |
| 3,229,980 | A | * | 1/1966 | Silberman | A63B 69/3632 473/232 |
| 3,428,325 | A | * | 2/1969 | Atkinson | A63B 15/00 473/256 |
| 3,743,297 | A | * | 7/1973 | Dennis | A63B 15/00 473/242 |
| 4,249,729 | A | * | 2/1981 | Gabrielidis | A63B 21/00043 473/464 |
| 4,555,111 | A | * | 11/1985 | Alvarez | A63B 69/0002 473/457 |
| 5,249,803 | A | * | 10/1993 | Giffin | A63B 15/00 473/256 |

(Continued)

FOREIGN PATENT DOCUMENTS

KR   2016 0099228 A   8/2016
WO   WO-2016/149648 A1   9/2016

OTHER PUBLICATIONS

Power Flex Golf Swing Trainer—Emma Elie retrieved Nov. 27, 2019. https://emmaelie.com/products/power-flex-swing-trainer.

(Continued)

*Primary Examiner* — Nini F Legesse
(74) *Attorney, Agent, or Firm* — Harness, Dickey & Pierce, P.L.C.

(57) ABSTRACT

A golf swing training apparatus includes a handle assembly, a flexible neck and a head assembly flexibly coupled to the handle assembly with the flexible neck. The head assembly has a frame assembly and a weight assembly flexibly coupled within the frame assembly with a plurality of weight supports with specific levels of elasticity.

23 Claims, 11 Drawing Sheets

(56) References Cited

U.S. PATENT DOCUMENTS

| | | | | |
|---|---|---|---|---|
| 5,599,021 | A | * | 2/1997 | Lary .................. A63B 15/00 473/219 |
| 5,735,752 | A | * | 4/1998 | Antonious ............ A63B 53/10 473/317 |
| 6,616,547 | B2 | * | 9/2003 | Vincent ............... A63B 53/047 473/334 |
| 8,172,696 | B2 | * | 5/2012 | Lum ................ A63B 69/3623 473/256 |
| 8,529,365 | B1 | | 9/2013 | Davis |
| 8,540,584 | B1 | | 9/2013 | Sorenson |
| 8,758,159 | B2 | * | 6/2014 | Morin ................ A63B 53/047 473/329 |
| 2002/0091010 | A1 | | 7/2002 | Tanimoto |
| 2007/0123399 | A1 | | 5/2007 | Kim |
| 2008/0032829 | A1 | | 2/2008 | Andrea et al. |
| 2014/0249002 | A1 | | 9/2014 | Fischer |

OTHER PUBLICATIONS

The Orange Whip Trainer—retrived Nov. 27, 2019. https://orangewhipgolf.com/products/the-orange-whip-trainer.

SKLZ Gold Flex Trainer—retrieved Nov. 27, 2019. https://sklz.implus.com/products/golf/sklz-gold-flex-trainer.

International Search Report and Written Opinion dated Feb. 26, 2020 in corresponding PCT Application No. PCT/US2019/065349.

Weck Method RMT Club—retrieved Dec. 9, 2019. https://www.weckmethod.com/products/rmt-club-functional-training-equipment-full-body-workout-hiit.

Impact Snap Device—retrieved Dec. 9, 2019. https://impactsnap.com/.

TruGolf Home Swing Studio—retrieved Dec. 9, 2019. https://trugolf.com/home-swing-studio/.

The Best Golf Training Aids Momentus Whoosh Swing Trainer—retrieved Dec. 9, 2019. http://thebestgolftrainingaids.com/momentus-whoosh-swing-trainer.

Impact Improver by Tiffany Faucette—retrieved Dec. 9, 2019. https://www.impactimprover.com/.

The Speed Stik—retrieved Dec. 9, 2019. https://www.getthespeedstik.com/extlp/speed-stik-bw99fus/.

Swing Whistle Golf Swing Tempo Trainer—retrieved Dec. 9, 2019. http://www.swingwhistle.com/.

The SuperSpeed Golf Training System—retrieved Dec. 9, 2019. https://superspeedgolf.com/.

Orange Whip Golf Swing Trainer—retrieved Dec. 9, 2019. https://orangewhipgolf.com/.

In the Hole! Golf PureShot Golf Swing Fan Golf Training Aid—retrieved Dec. 9, 2019. http://www.intheholegolf.com/PUR-GSF/PureShot-Golf-Swing-Fan---Golf-Training-Aid.html.

Jen Reviews Best Golf Swing Trainer—retrieved Dec. 9, 2019. https://www.jenreviews.com/best-golf-swing-trainer/.

The Leadbetter Golf Academy the SwingSetter by David Leadbetter—retrieved Dec. 9, 2019. https://davidleadbetter.com/store/teaching-aids/swingsetter/.

EGolfinstruction Golf Training Aids SwingRite—retrieved Dec. 9, 2019. https://www.egolftrainingaids.com/store-categories/SwingRite-p61684134.

Swing Caddy, Best Golf Swing Trainer for Speed and Accuracy—retrieved Dec. 9, 2019. https://www.birdiegolfswing.com/blog/swing-caddy-golf-swing-trainer-full-6-months-review/.

Golf Insider UK Best Golf Training Aids—retrieved Dec. 9, 2019. https://golfinsideruk.com/golf-training-aids-dont-buy-until-read-this/.

Go Time Golf Review: SwingClick Golf Swing Trainer—retrieved Dec. 9, 2019. http://gotimegolf.blogspot.com/2015/12/go-time-golf-review-swingclick-golf.html.

\* cited by examiner

GOLF SWING TRAINING APPARATUS

CROSS-REFERENCE TO RELATED APPLICATIONS

This application is a non-provisional application of provisional application 62/777,585, filed Dec. 10, 2018, the disclosure of which is incorporated by reference herein.

FIELD

The present disclosure relates to a golf swing training apparatus, and more particularly, to a golf swing apparatus that is smaller than a golf club and simulates the feel of a golf club in an easily transportable form factor.

BACKGROUND

Practicing a golf swing in between rounds is important for golfers to maintain their consistency or groove. Often times, golfers cannot afford the time to practice on a regular basis. In addition, the weather in many areas also does not allow for outdoor practice. Practicing within a home presents difficulties in that golf clubs are relatively large, ceilings are typically low and other obstacles are present. The space limitations necessitate the use of a device with a shorter length.

When swinging an actual golf club, a golfer establishes and feels a circular and planar weight movement. During a downswing in golf, acceleration of the hands from the top of the swing causes initial bending of the shaft resulting in significant stored energy that is released at impact, which results in a more powerful shot. This "feeling" of stored and released energy caused by a combination of factors, including a bending and unbending of the shaft as well as wrist position throughout the swing, is an important component of a golf club's behavior in a golf swing. Although some training aids provide feedback on when a golfer's wrists break or the angle of the shaft at impact, the "feeling" of stored and released energy has not been obtained in known golf swing practice aids in a smaller and more compact design and form factor that emulates the feeling of swinging an actual club.

SUMMARY

This section provides a general summary of the disclosures, and is not a comprehensive disclosure of its full scope or all of its features.

The present disclosure provides a golf swing training apparatus that provides a simulated feel in an easily transportable and usable form factor.

In one aspect of the disclosure, a golf swing training apparatus includes a handle assembly, a flexible neck and a head assembly flexibly coupled to the handle assembly with the flexible neck. The head assembly has a frame assembly and a weight assembly flexibly coupled within the frame assembly with a plurality of weight supports.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The examples disclosed below are not intended to be exhaustive or to limit the disclosure to the precise forms disclosed in the following detailed description. Rather, the examples are chosen and described so that others skilled in the art may utilize their teachings.

Figure 1A:
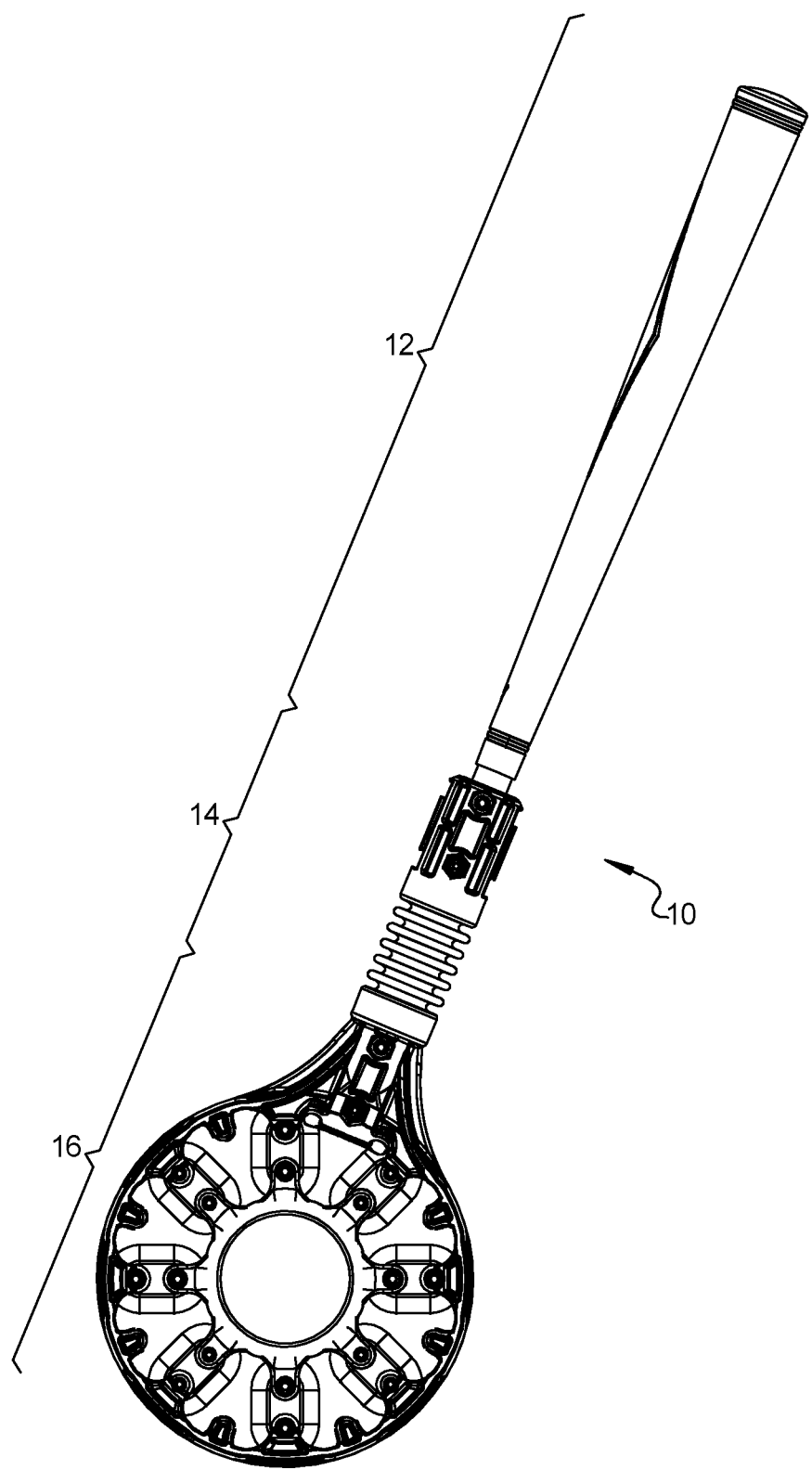
FIGS. 1A and 1B is a front view of a golf swing training apparatus.
Figure 1B:
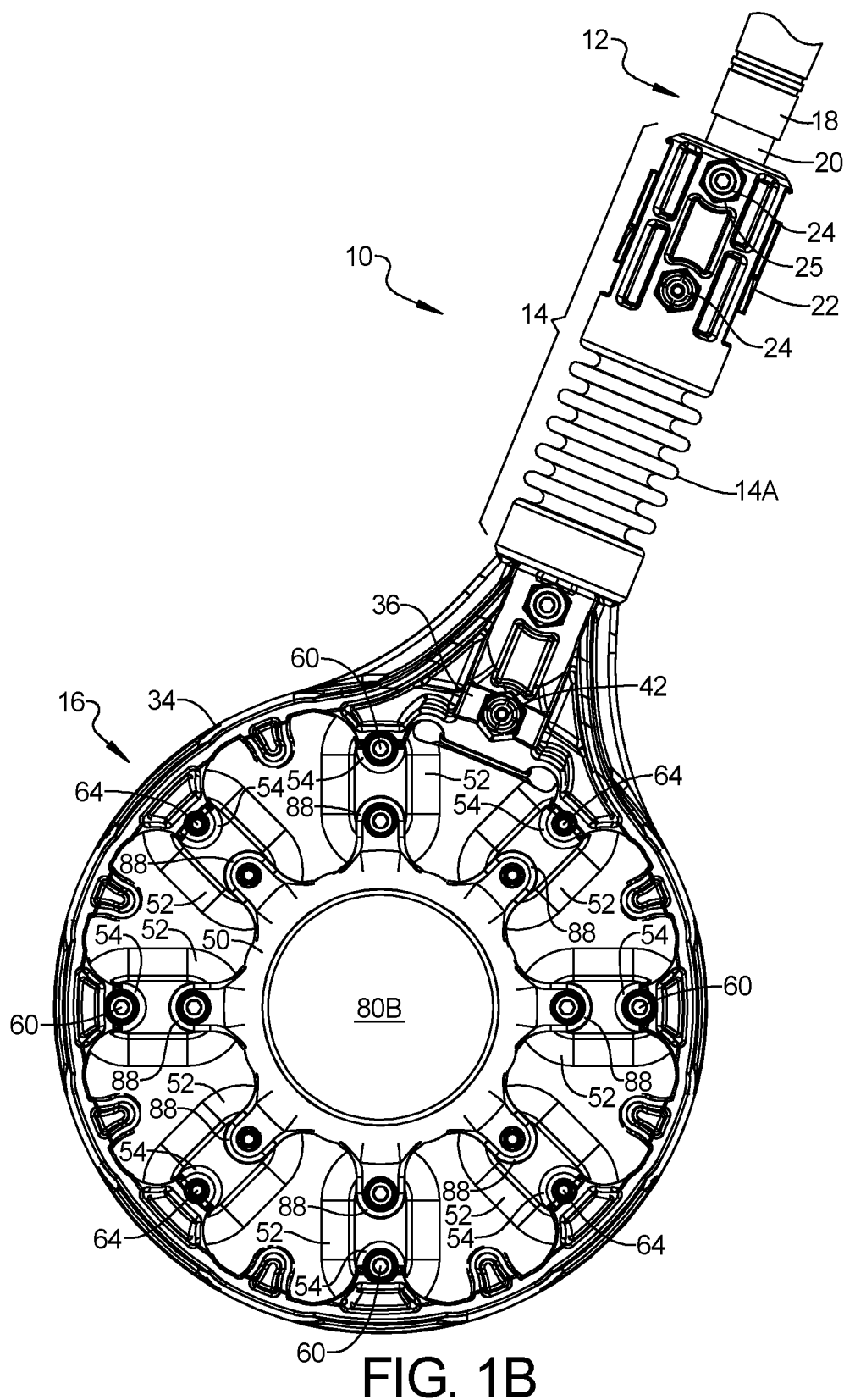
Figure 2:
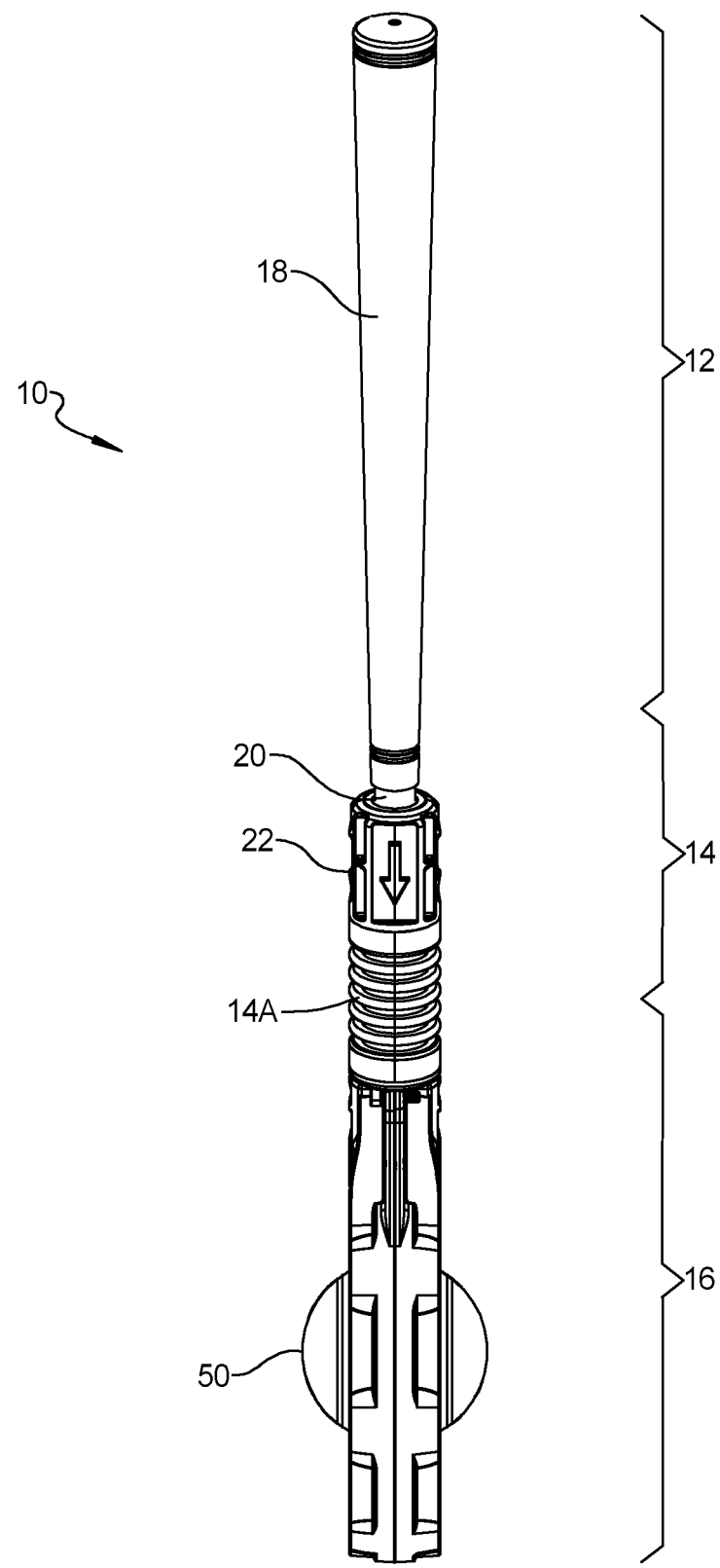
FIG. 2 is a top view of a golf swing training apparatus.

Referring now to FIGS. 1 and 2, a golf swing training apparatus 10 is illustrated. The golf swing training apparatus 10 comprises a handle assembly 12, a flexible neck 14 assembly and a head assembly 16. The handle assembly 12 includes a grip 18 and a shaft 20. The grip 18 may be a golf grip formed of the various materials and shapes that a golf grip is basically formed from. The grip 18 is secured over the shaft 20. The shaft 20 may be golf club shaft or a portion of a golf club shaft. The grip 18 may be replaceable in a similar manner to a golf club to allow for practice with different shapes and diameters of grips. The length of the whole golf swing training apparatus 10 may be about 22 inches, which is considerably less than the length of a golf club.

The grip 18 and the shaft 20 may also be configured in various other ways including being integrally formed from metal or plastic.

The flexible neck assembly 12 comprises a handle coupler 22. The handle coupler 22 is a generally cylindrical shaped portion that receives the shaft 20 of the handle assembly therein. If the shaft 20 is tapered, the inside of the handle coupler 22 is tapered in a corresponding manner as will be instructed in further detail below. The handle coupler 22 has a plurality of fasteners 24 that extend through the shaft and through the other side of the handle coupler 22. In this example, the fasteners 24 include a bolt and a nut. Other types of fasteners 24 include, but are not limited to, a rivet pin or screw. Also, in addition to a bolt, a locking washer or washers may be used to secure the shaft 20. Likewise, conforming materials, such as foam, rubber, or other materials, may be disposed between the shaft 20 and the handle coupler 22 to provide a secure fit. The fasteners 24 may have a head or nut recessed within a recess 25. Likewise, any of the fasteners described below may be partially recessed in a recess.

The flexible neck assembly 14 comprises a flexible neck 14A may be coupled to the handle coupler 22 by overmolding or other another process. The flexible neck 14A has a hardness that may vary depending upon the desired usage. That is, the golf swing training apparatus 10 may be used for different types and sizes of people with different types of swing characteristics. Therefore, the hardness or shore value of the flexible neck 14 may be changed to obtain the desired swing feel based on a golfer's swing characteristics including swing speed. The feel of different types of clubs such as a driver, a 7 iron or a wedge may be simulated. Each club has a different length and weight that can be simulated by changing the hardness or shore value of the flexible neck 14. In constructed examples, shore values from 80 A through 60 D were used. However, other shore values may be used. The material of the flexible neck 14A may also vary depending upon the desired shore values. Examples of suitable materials include various types of polyurethane, thermoplastic, polyurethane or other materials. Of course, other types of material may also be used.

Figure 3A:
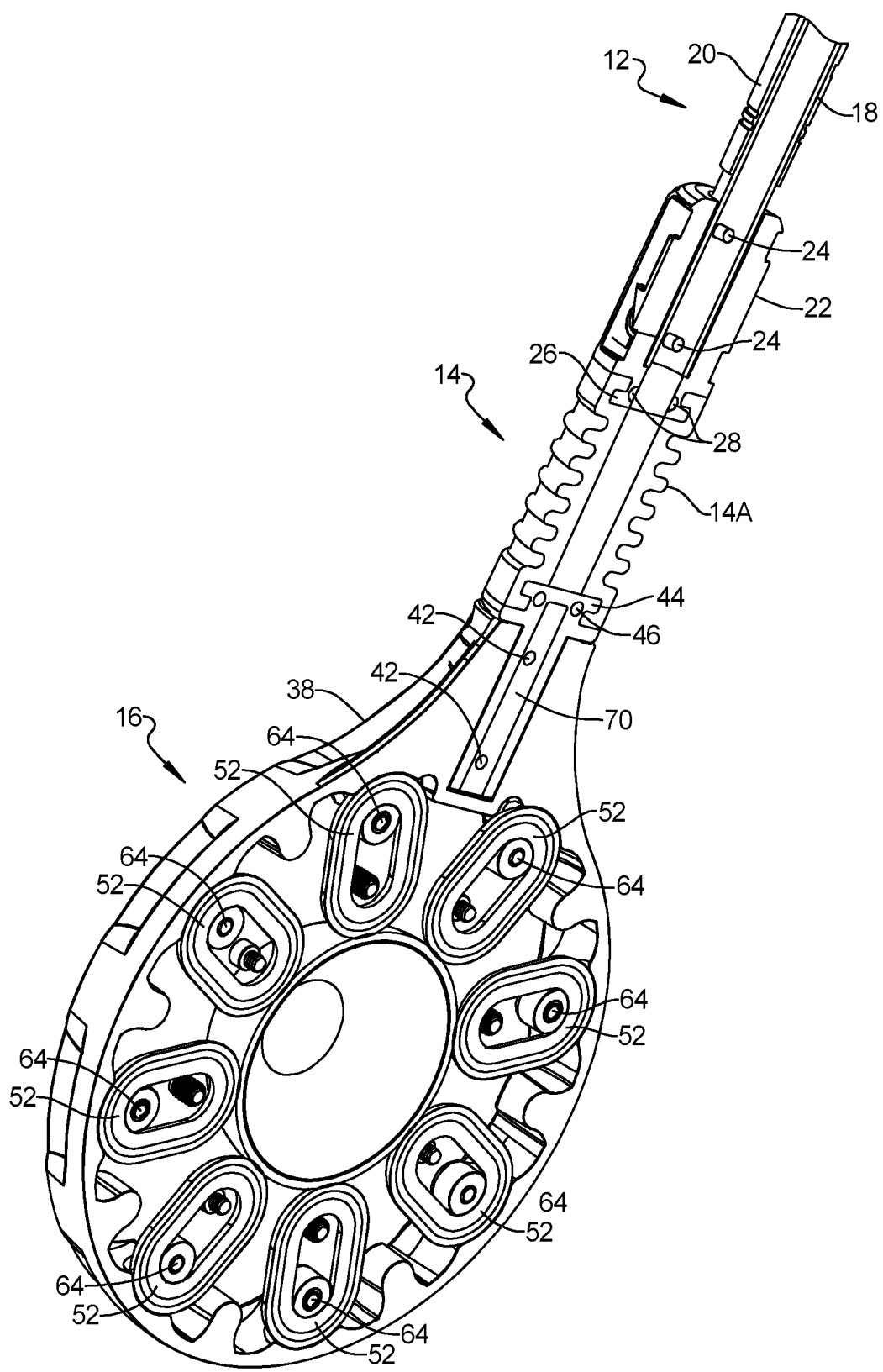
FIGS. 3A and 3B are partial perspective cross-sectional views of the golf swing training apparatus.
Figure 3B:
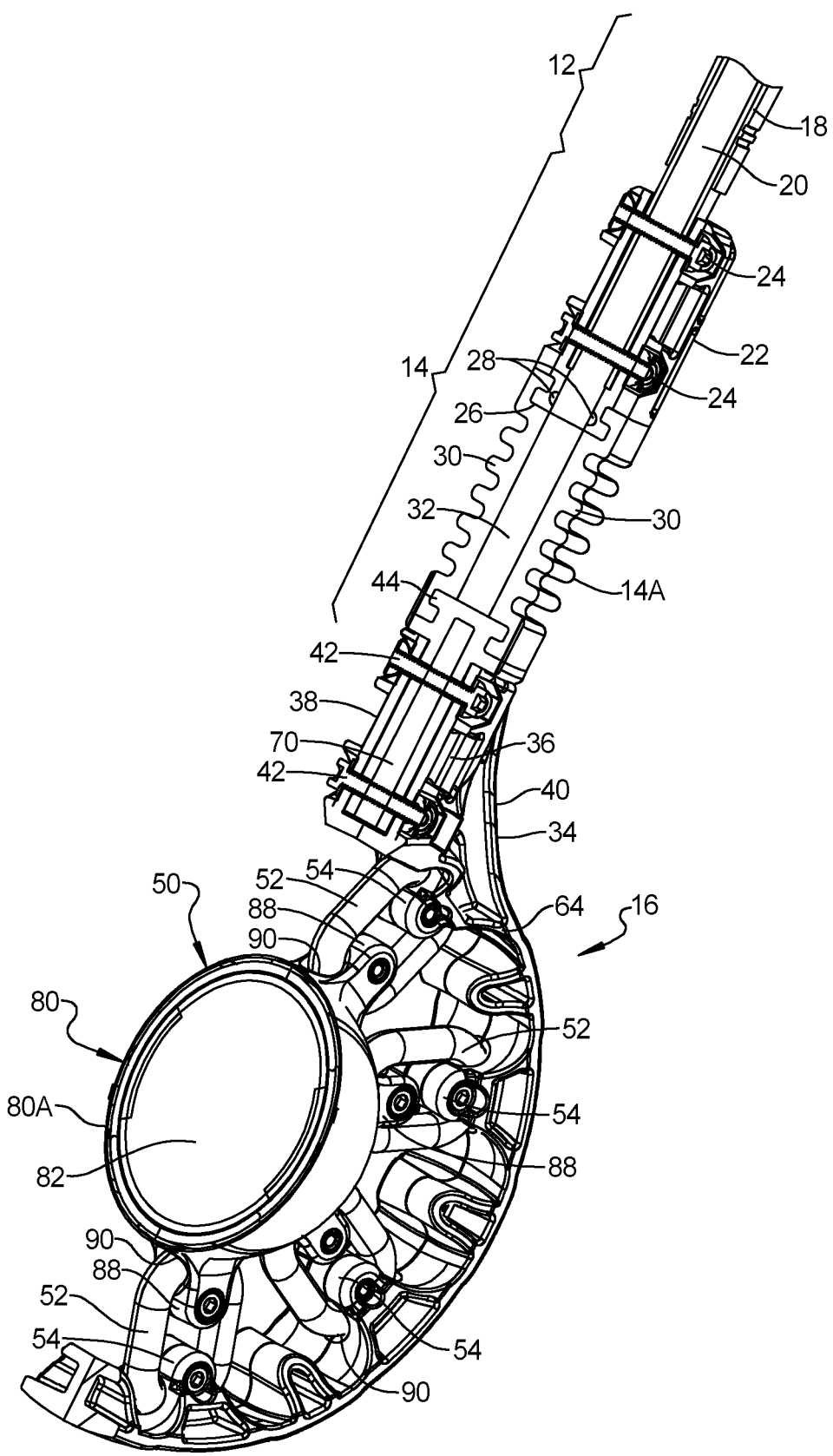

As is best shown in FIGS. 3A and 3B, the handle coupler 22 may include a flange 26. The flange 26 may facilitate over-molding of the flexible neck 14A onto the handle coupler 22. Cross channels 28 may also be formed adjacent to the flange 26. The cross channels 28 allow flow of the material of the flexible neck 14 through or adjacent to the flange 26 during the over-molding process to strengthen the overall coupling between the flexible neck 14A and the handle coupler 22. Ribs 30 may also be molded into the flexible neck 14. Likewise, the flexible neck 14A may also have a longitudinally extending hollow passage or channel 32 to facilitate bending. The channel 32 may be cylindrical or slightly tapered to allow removability during the molding process. Of course other types of fasteners may be used in place of over-molding such as screws, rivets, tie wraps and pipe clamps.

The head assembly 16 is formed of a frame 34 that has a head coupler 36 that couples to the flexible neck assembly 14. The frame 34 and the head coupler 36 may be integrally formed. The frame 34 may be formed of a first frame portion 38 and a second frame portion 40. The first frame portion 38 and the second frame portion 40 are coupled together with fasteners 42. The first frame portion 38 and the second frame portion 40 are identical. The fasteners 42 extend through the head coupler 36.

The flexible neck assembly 14 may have a flange 44 and cross channels 46 that are formed in a similar manner to the flange 26 and the cross channels 28 described above. It should be noted that the cross channels illustrated in this example are adjacent to the flanges 26, 44, respectively.

The head assembly 16 also includes a weight assembly 50. The weight assembly 50 is supported or coupled to the frame 34 with a plurality of weight supports 52. The weight supports 52 may also have different elasticity characteristics in different models to achieve the desired effect for the user of the golf swing apparatus 10. The weight supports 52, as illustrated, are O-ring. Of course, single length elements may also be used. Examples of suitable O-ring materials include various types of rubber, such as nitrile, butadiene, silicone, ethylene-propylene, chloroprene, natural rubber and butyl rubber.

Figure 7:
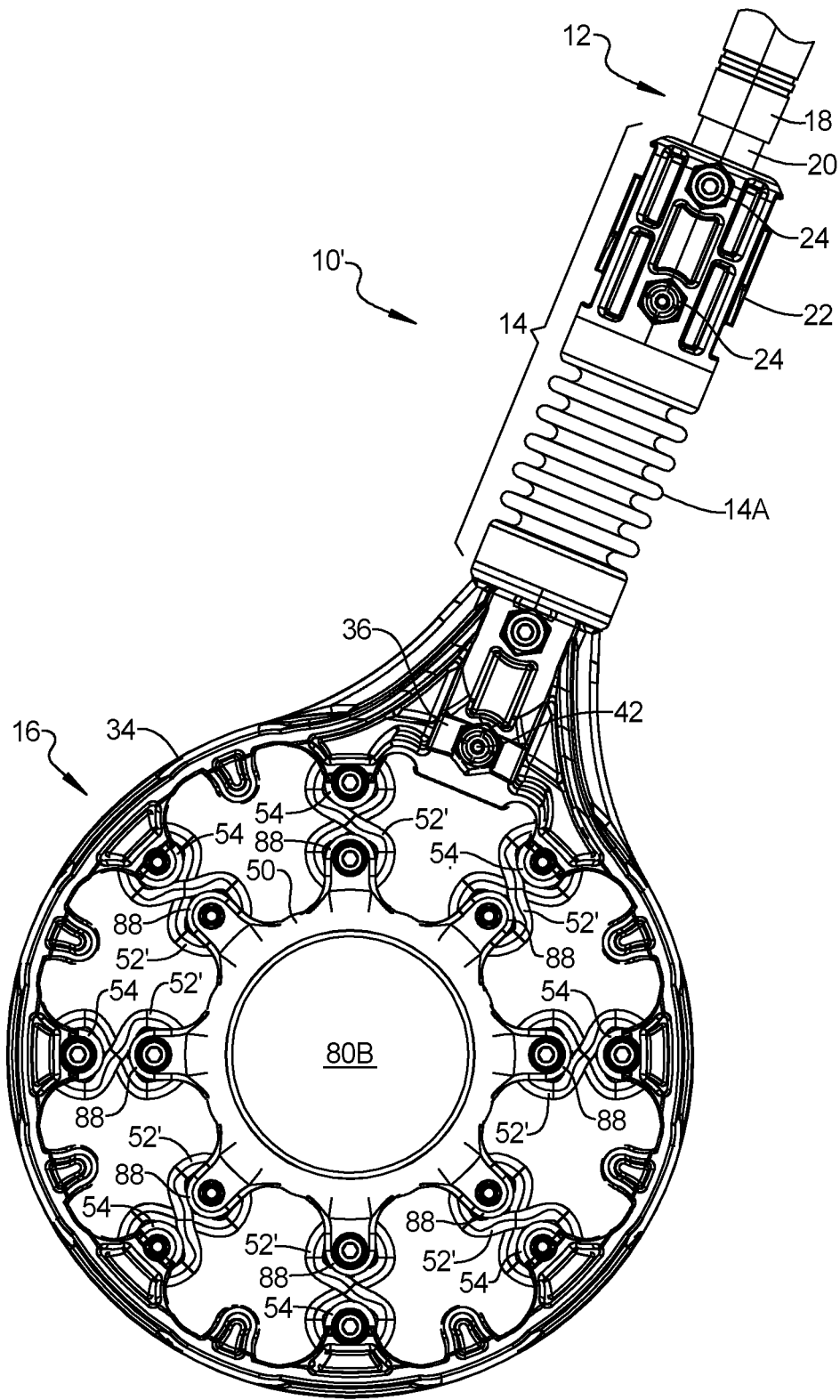
FIG. 7 is a front view of the golf swing training apparatus having an alternate mounting of the weight supports.

As is best shown in FIG. 7, weight supports 52 may be twisted into a figure height.

Figure 4A:
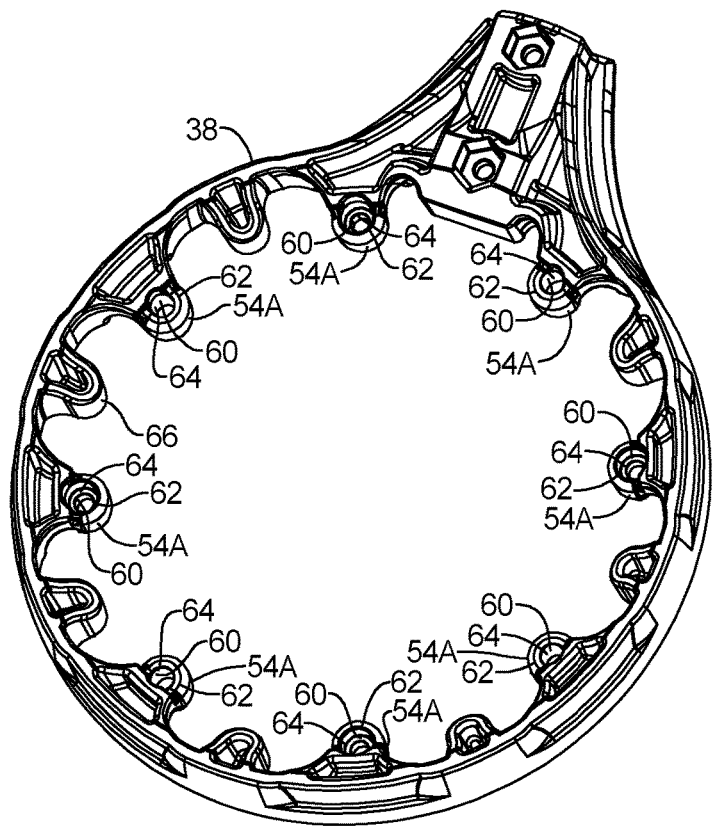
FIGS. 4A and 4B are respective top and bottom views of the first and second frame portions.
Figure 4B:
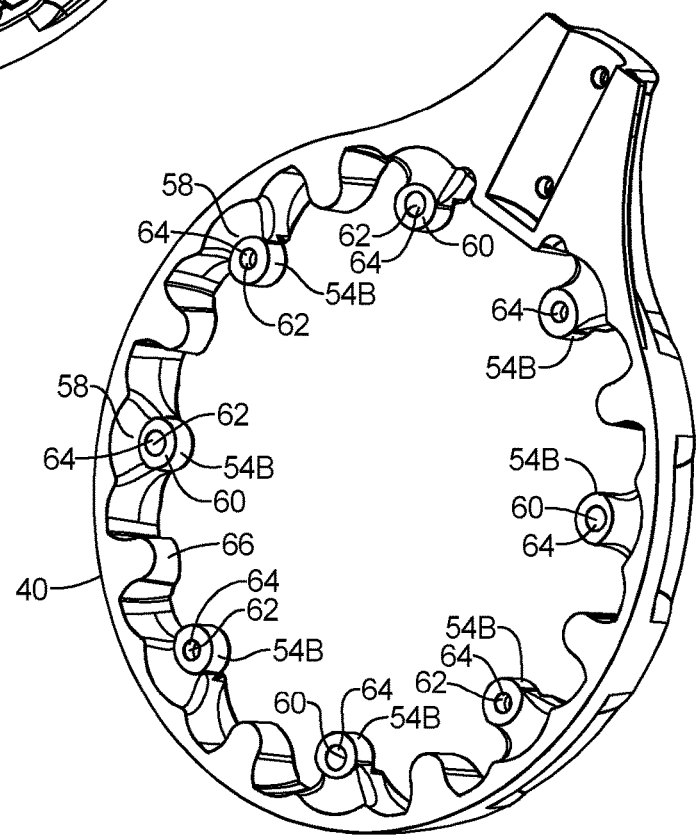

The weight supports 52 are coupled to the frame 34 with frame retainers 54. As will be described in more detail below, the frame retainers 54 may comprise a first portion 54A and a second portion 54B. This is best illustrated in FIGS. 4A and 4B. In this example, the frame retainer portions 54A, 54B extend from the first frame portion 38 and the second frame portion 40. The frame retainer portions 54A, 54B have a channel portion 58 for receiving the weight supports 52. When the first frame retainer 54A and the second frame retainer portion 54B are coupled together, the weight support 52 is secured therebetween. The frame retainer portions 54A, 54B extend in a radially inward direction and secure the weight supports 52. A threaded insert 60, such as nut, may be molded or fit into an opening 64 of the respective frame retainer portions 54A, 54B. Fasteners through the openings 62 and the insert 60 couples the first frame portion 38 and the second frame portion 40 together. The first frame portion 38 and the second frame portion 40 may be molded in an identical fashion and the inserts 60 placed thereafter on alternate sides.

Reinforcements 66 may be formed on the interior perimeter of each of the first frame portion 38 and the second frame portion 40. The reinforcements 66 strengthen the outer wall of the frame 34 during operation.

Figure 5A:
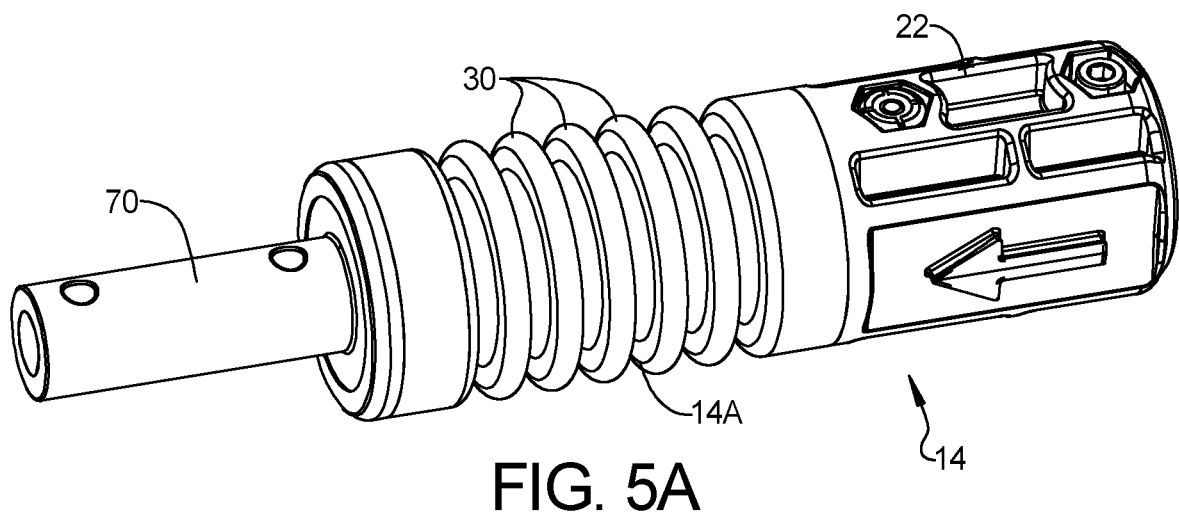
FIG. 5A is a perspective view of the flexible neck assembly.
Figure 5B:
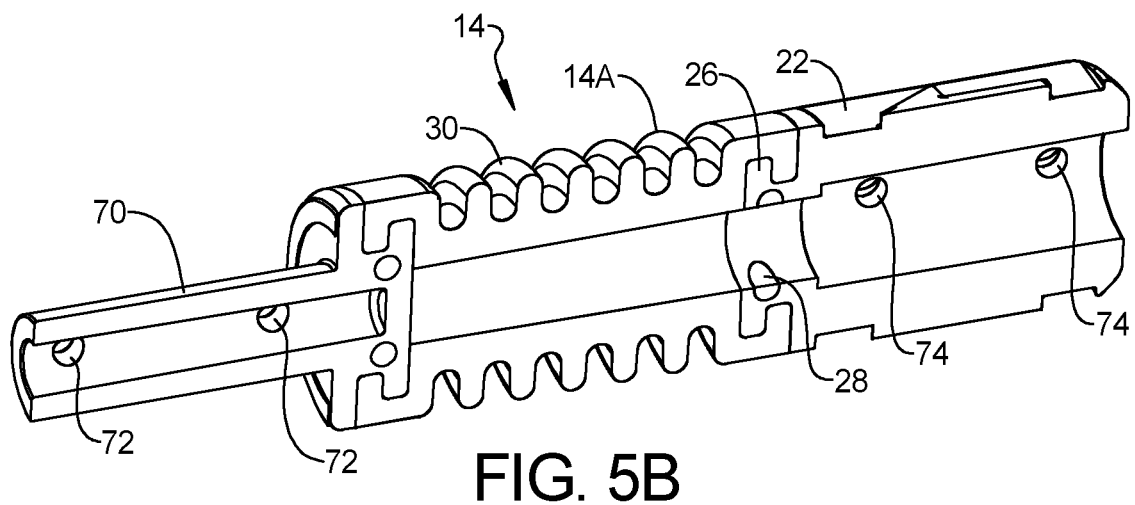
FIG. 5B is a cross-sectional view of the flexible neck assembly of FIG. 5A.

Referring now also to FIGS. 5A and 5B, an enlarged perspective view and cross-sectional view of the coupler 22, the flexible neck assembly 14 and a head insert 70 are illustrated. The head insert 70 has openings 72 therethrough. The openings 72 align with the fasteners 42 of the head assembly 16. The head insert 70 is part of the flexible neck assembly 14. Openings 74 through the handle coupler 22 of the flexible neck assembly 14, the openings 74 receive the fasteners 24.

Figure 6:
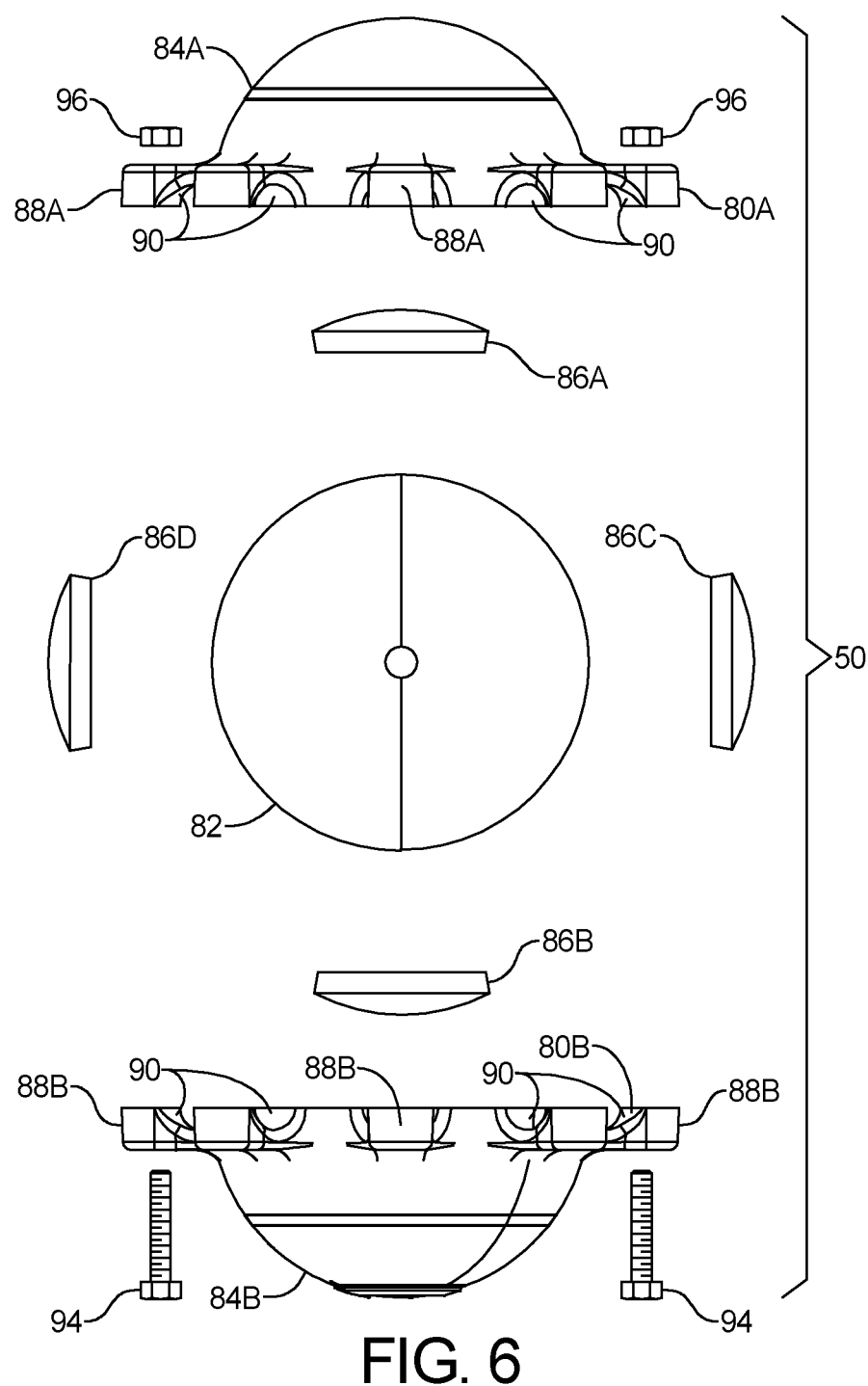
FIG. 6 is an exploded view of the weight assembly.

Referring now also to FIG. 6, further details of the weight assembly 50 are set forth. The weight assembly 50 comprises a first weight assembly housing portion 80A and a second weight assembly housing portion 80B. The housing portions 80A and 80B may be identical. A weight 82 is secured within the first weight assembly housing portion 80A and the second weight assembly housing portion 80B. The weight 82 may have a weight that corresponds to obtaining desired characteristics of the golf swing training apparatus 10. In constructed examples, the center assembly was 22 ounces to 40 ounces including the weights and housing. That is, the weight 82 may vary to obtain different swinging characteristics of the apparatus 10. In this example, the weight 82 is spherical. However, other shapes of the weight 82 may be used. In this example, the first weight assembly housing portion 80A and the second weight assembly housing 80B are formed of a plastic material that form a partial cavity 84A, 84B. The cavities 84A, 84B receive the weight 82 therein. In this example, the weight 82 is formed from a hard material such as metal or plastic. To prevent the weight 82 from rattling within the cavity 84A, 84B, one or more spacers 86A, 86B, 86C, 86D are disposed between the cavity 84A and the weight 82. Likewise, a spacer 86B is disposed between the weight 82 and the cavity 84B. Other spacers 86C, 86D may be placed in various positions between the weight 82 and the cavity. The spacers 86A, 86B, 86C, 86D may formed from a conformable material such as foam rubber or the like.

The first weight assembly housing portion 80A and the second weight assembly housing portion 80B form a weight retainer 88. The weight retainer 88 has a first weight retainer portion 88A and a second weight retainer portion 88B. The weight retainers 88 are directly opposite the frame retainers 54. The weight supports 52 extend between the frame retainers 54 and the weight retainers 88. The first weight retainer portion 88A is formed in the first weight assembly housing portion 80B. A channel 90 in each of the weight retainers 88 are used to receive the weight supports 52. As mentioned above, the weight supports may be O-rings and the channel 90 may be curved to retain the O-ring therein.

The first weight assembly housing portion 80A and the second weight assembly housing portion 80B may be coupled together with retainer fasteners 94 such as bolts and inserts 96 such as nuts.

In general, the integration of all of the components including the shaft, flexible neck, head assembly, and the chosen weights provide a simulated feel of swinging a golf club in a device much smaller than a golf club. The combination of variables can be altered to emulate specific clubs (driver versus wedge) and address specific characteristics of a golfer (e.g., lighter and more flexible for children, heavier and more rigid for advanced golfers with higher skill levels and greater strength).

More specifically, the amount of movement of the head assembly 16 and the weight 82 may be controlled relative to the handle assembly 12 by the elasticity of both the weight supports 52 and the flexible neck 14A. The amount of weight also changes the movement or feel of the device. The grip 18 is held by the operator and the golf swing training apparatus 10 is rotated in a manner that corresponds to the use of a golf club. A swing may be performed with the weight supports 52 stretching or extending in the direction of the swing. As will be appreciated, the weight 82 is behind the frame during a forward swing. The whipping motion or lag as described above occurs as the swing and the flexible neck 14A catch up to the position of the shaft 20 and the grip 18 coupled thereto.

Referring now to FIG. 7, the weight supports 52' are installed in a twisted manner and resemble a figure eight rather than an oval in the previous example. By providing each weight support 52' with a single twist a different swing feel can be established.

Figure 8:
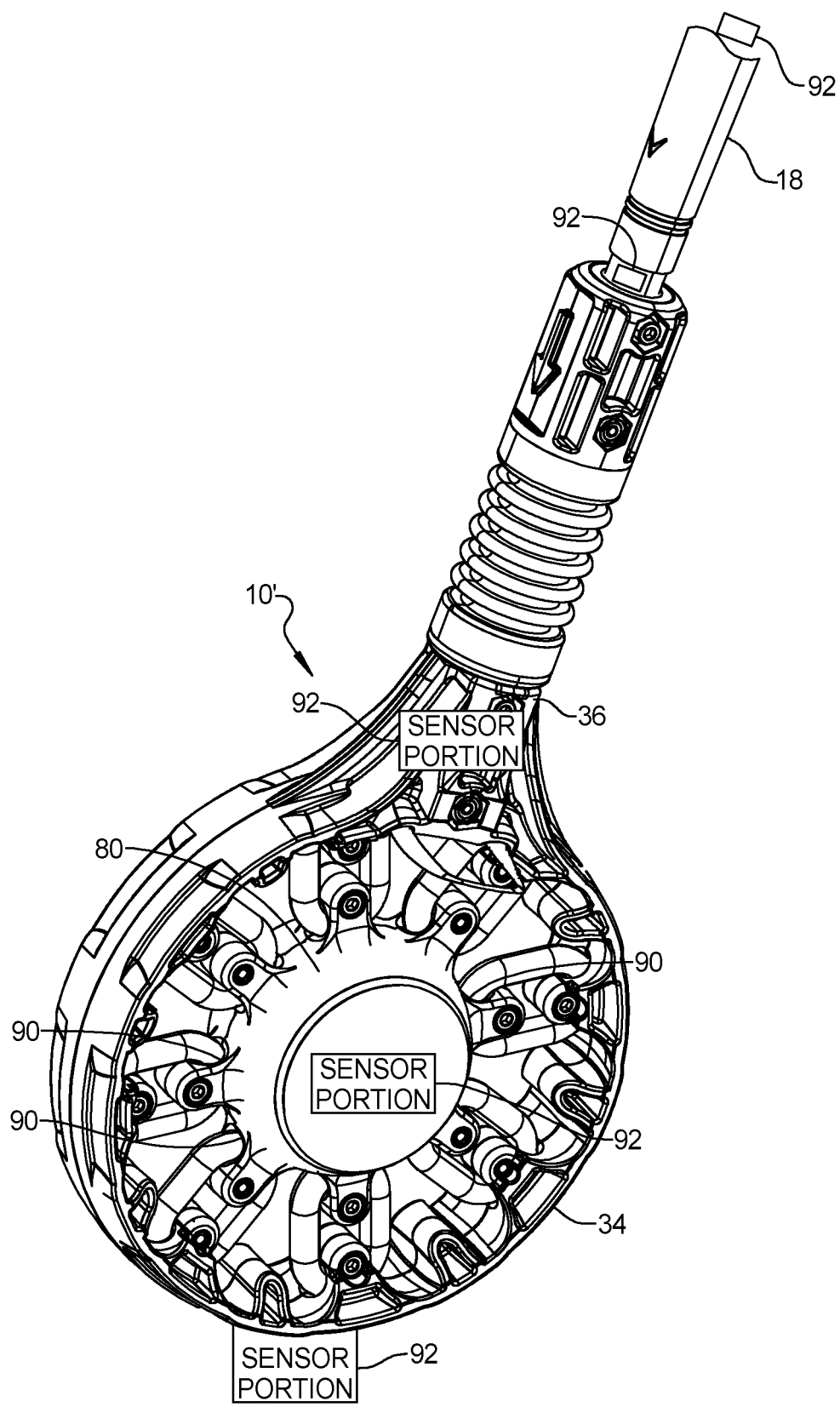
FIG. 8 is a perspective view of an alternative example of a golf swing training apparatus 10'.
Figure 9:
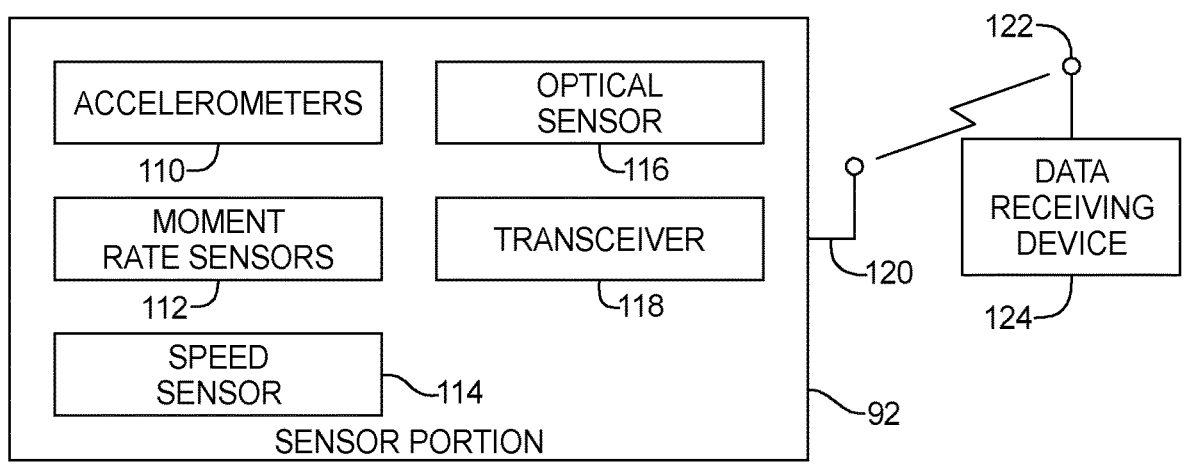
FIG. 9 is a block diagrammatic view of a sensor portion for use with a golf swing training apparatus.

Referring now to FIGS. 8 and 9, a golf swing training apparatus 10' is illustrated. The same components illustrated above are set forth with the additional attachment of a sensor portion 92. The sensor portion 92 may contain one or more sensors and may be located at one or more positions on the golf swing training apparatus 10'. The sensor portion 92 may, for example, be disposed at or within the weight assembly housing 80, on a location of the frame 34 such as at the end of the frame, at the head coupler 36, at the end of the shaft 20 or anywhere on the grip 18 including either end thereof. The sensor portion 92 may also be disposed in or at the handle assembly. One or more sensor portions 92 together may be used to collect various types of data corresponding to the movement of the apparatus 10'.

The sensor portion 92 may include but is not limited to an accelerometer 110, a moment rate sensor or sensors 112, speed sensors 114, an optical sensor 116 and a transceiver 118. The accelerometer 110 may include one or more accelerometers that sense the acceleration in a particular direction. The accelerometer may include an X, Y, and Z axis accelerometer. The moment rate sensors 112 may sense a moments around the three axes of the accelerometer. Yaw, roll and pitch of the golf swing training apparatus 10' may be obtained. The accelerometers 110 and the moment rate sensors 112 may be integrally formed within a single semiconductor or a single sensor housing.

The speed sensor 114 senses the speed of the golf swing training apparatus in a particular direction. More than one speed sensor may sense the speed of the golf swing training apparatus 10'. An optical sensor 116 may generate an optical signal and receive a corresponding reflective optical signal 116 to sense a position. In operation, the optical sensor may sense the position of an actual or theoretical ball in front of a user of the golf swing training apparatus 10'. A transceiver 118 is coupled to the plurality of sensors 110-116 and communicates the signals through an antenna 120 and a receiving antenna 122 to a data receiving device 124 such as a mobile phone. The data receiving device 124 may display various data collected by the sensor portion 92. In operation, the optical sensor 116 may generate a laser or light target to a ball or a target so that a detection of whether the ball contacts the target is set forth. The target may be equipped with sensors that intercommunicate with the data receiving device 124. Relationships of swing speeds, swing planes, swing angles and the like may all be generated at the data receiving device 124. Algorithms may be used to estimate the swing and distance of a theoretical ball based upon various characteristics. The simulation of actual golf course play may be simulated at the data receiving device 124 based on the sensor signals received and course layouts. The data may be used by the golfer to determine important swing characteristics like swing speed and tempo. The data from sensor can also be used in an algorithm to determine the speed, trajectory, distance and spin rate of a theoretical ball. This data could be further used to simulate a golf game that is played on a mobile device (smartphone or tablet), game consul, computer or smart television.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A golf swing training apparatus comprising:
a rigid handle assembly;
a flexible neck;
a head assembly flexibly coupled to the rigid handle assembly with the flexible neck therebetween, the head assembly comprising a rigid frame assembly and a weight assembly flexibly coupled within the frame assembly with a plurality of weight supports; and
a first plurality of weight support retainers extending radially inwardly from the frame assembly;
the rigid frame assembly disposed around the weight assembly, the plurality of weight supports extending radially inwardly from the first plurality of weight support retainers.

2. The golf swing training apparatus as recited in claim 1 wherein the rigid frame assembly comprises a first frame portion and a second frame portion.

3. The golf swing training apparatus as recited in claim 2 wherein the first frame portion and the second frame portion are coupled together with a plurality of fasteners.

4. The golf swing training apparatus as recited in claim 2 wherein the first frame portion and the second frame portion cooperatively form the first plurality of weight support retainers.

5. The golf swing training apparatus as recited in claim 4 wherein the first plurality of weight support retainers extend radially inwardly from the first frame portion or the second frame portion.

6. The golf swing training apparatus as recited in claim 5 wherein each of the first plurality of weight support retainers are coupled to one of the first plurality of weight supports.

7. The golf swing training apparatus as recited in claim 6 wherein the first plurality of weight support retainers each comprise a channel portion receiving one of the plurality of weight supports.

8. The golf swing training apparatus as recited in claim 7 wherein the plurality of weight supports comprise O-rings.

9. The golf swing training apparatus as recited in claim 5 wherein the first frame portion and the second frame portion comprise reinforcements between at least some of the first plurality of weight support retainers.

10. The golf swing training apparatus as recited in claim 1 wherein the weight assembly comprising a weight assembly housing comprising a weight therein.

11. The golf swing training apparatus as recited in claim 10 wherein the weight assembly housing comprising a first weight housing portion and a second weight housing portion.

12. The golf swing training apparatus as recited in claim 11 wherein the weight is coupled between the first weight housing portion and the second weight housing portion.

13. The golf swing training apparatus as recited in claim 1 wherein the head assembly comprises a head coupler coupled to a flexible neck assembly comprising the flexible neck.

14. The golf swing training apparatus as recited in claim 13 wherein the flexible neck assembly comprises a head insert coupled to a head coupler of the heads assembly.

15. The golf swing training apparatus as recited in claim 14 wherein the head insert is coupled to the head coupler with a plurality of fasteners.

16. The golf swing training apparatus as recited in claim 14 wherein the head insert comprises a cross channel and a flange coupling the flexible neck to the head insert.

17. The golf swing training apparatus as recited in claim 1 wherein a flexible neck assembly comprising the flexible neck comprises a handle coupler coupled to a shaft of the handle assembly.

18. The golf swing training apparatus as recited in claim 17 wherein the handle coupler comprises a cross channel and a flange coupling the flexible neck of the flexible neck assembly to the handle coupler.

19. The golf swing training apparatus as recited in claim 17 wherein the handle assembly comprises a grip coupled to the shaft.

20. The golf swing training apparatus as recited in claim 17 wherein the shaft is coupled to the handle coupler with a plurality of fasteners.

21. The golf swing training apparatus as recited in claim 1 further comprising a plurality of sensors coupled to at least one of the handle assembly, the flexible neck and the head assembly, the sensors corresponding to a movement of the golf swing training apparatus.

22. A golf swing training apparatus comprising;
a handle assembly;
a neck;
a head assembly coupled to the handle assembly with the neck therebetween, the head assembly comprising a frame assembly and a weight assembly coupled within the frame assembly with a plurality of weight supports; and
the weight assembly housing comprising a first weight housing portion and a second weight housing portion;
further comprising a first spacer coupled between the weight and the first weight housing portion and a second spacer coupled between the second weight housing portion.

23. A golf swing training apparatus comprising:
a handle assembly;
a flexible neck; and
a head assembly flexibly coupled to the handle assembly with the flexible neck, the head assembly comprising a frame assembly and a weight assembly flexibly coupled within the frame assembly with a plurality of weight supports, wherein the frame assembly comprises a first frame portion and a second frame portion cooperatively forming a first plurality of weight support retainers that extend radially inwardly from the first frame portion or the second frame portion.

* * * * *